US00RE39924E

(19) United States
(12) Reissued Patent
Dubé

(10) Patent Number: US RE39,924 E
(45) Date of Reissued Patent: Nov. 27, 2007

(54) REFRIGERATION SYSTEM WITH MODULATED CONDENSING LOOPS

(75) Inventor: Serge Dubé, 1341 Principale, St-Zotique, Québec (CA), J0P 1Z0

(73) Assignee: Serge Dubé, St-Lazare Québec

(21) Appl. No.: 11/061,085

(22) Filed: Jan. 7, 2005

Related U.S. Patent Documents

Reissue of:
(64) Patent No.: 6,502,412
Issued: Jan. 7, 2003
Appl. No.: 09/988,111
Filed: Nov. 19, 2001

(51) Int. Cl.
*F25B 7/00* (2006.01)
*F25B 41/00* (2006.01)

(52) U.S. Cl. ..... 62/175; 62/335
(58) Field of Classification Search ..... 62/175, 62/196.4, 79, 238.6, 332, 335
See application file for complete search history.

(56) References Cited

U.S. PATENT DOCUMENTS 4,437,317 A * 3/1984 Ibrahim ..... 62/81
5,070,704 A * 12/1991 Conry ..... 62/175
5,335,508 A * 8/1994 Tippmann ..... 62/129
5,673,567 A * 10/1997 Dube ..... 62/117
5,826,433 A * 10/1998 Dube ..... 62/196.4
6,089,033 A * 7/2000 Dube ..... 62/156
6,216,481 B1 * 4/2001 Kantchev ..... 62/238.7
6,983,613 B2 * 1/2006 Dube ..... 62/81
2001/0023594 A1 * 9/2001 Ives ..... 62/335

* cited by examiner

*Primary Examiner*—Marc Norman
(74) *Attorney, Agent, or Firm*—Ogilvy Renault LLP

(57) ABSTRACT

A refrigeration system having a main refrigeration circuit having a condensing stage, wherein a first refrigerant in a high pressure gas state is condensed at least partially to a liquid state. The condensing stage has a [pair of] stand-alone condensing stage closed loop[s] in heat exchange relation with the main refrigeration circuit. The stand-alone condensing stage closed loop[s are] *is in* parallel [one to another] *with a condenser of the condensing stage* and [each comprise] *comprises* a second refrigerant circulating between at least a heat absorption stage, wherein the second refrigerant absorbs heat from the first refrigerant in the main refrigeration circuit so as to condense the first refrigerant to the liquid state, and a heat release stage, wherein the second refrigerant releases the absorbed heat. The condensing stage has modulating valves for selectively and quantitatively modulating the temperature of said first refrigerant and compressor head pressure.

22 Claims, 2 Drawing Sheets

REFRIGERATION SYSTEM WITH MODULATED CONDENSING LOOPS

Matter enclosed in heavy brackets [ ] appears in the original patent but forms no part of this reissue specification; matter printed in italics indicates the additions made by reissue.

FIELD OF THE INVENTION

The present invention generally relates to refrigeration systems, and more particularly, to modulate closed condensing loops for use therewith.

BACKGROUND OF THE INVENTION

In a typical refrigeration system, particularly those found in supermarkets, a plurality of evaporators are used to refrigerate foodstuff in refrigerated display cases. Such systems basically comprise a closed circuit having a compressor stage, a condenser stage, an expansion stage and an evaporator stage. Other stages may be added to the above described basic refrigeration circuit in order to recuperate heat, or to provide refrigeration systems with defrosting loops for high speed defrosting of the evaporators. For instance, U.S. Pat. No. 5,673,567, issued on Oct. 7, 1997 to the present assignee, discloses a refrigeration system with a heat reclaim loop for recuperating heat from hot high pressure refrigerant gas outletting from the compressor stage, rather than evacuating the heat through the condensers, where the heat would be lost to the atmosphere. Thus, the heat reclaim loop is provided in parallel to the condenser stage in order to recuperate heat in heat exchange devices rather than rejecting it to the atmosphere. Preferably, in the cooler seasons, the heat is used for heating the entrance area and other specific colder areas of supermarkets. In the warmer months, the heat may be recuperated for heating water.

U.S. Pat. No. 5,826,433, issued on Oct. 27, 1998 to the present assignee, discloses modification to the above described patent, whereby a modulating valve is provided for efficiently controlling the rate of heat reclaim versus the heat rejection through the condenser stage.

Finally, U.S. Pat. No. 6,089,033, issued on Jul. 18, 2000 to the present assignee discloses a refrigeration system configuration in order to defrost evaporator units at higher speeds.

These refrigeration systems, and generally most refrigeration systems used in supermarkets, have roof top condensers in order to reject heat at the outlet of the compressor stage, whereby the refrigerant is condensed at least partially to a liquid state. Unfortunately, the loops to the roof top condensers extend the piping length of the refrigeration system. Accordingly, the piping networks of refrigeration systems are filled with refrigerant to provide every stage with the necessary conditions for refrigeration. Furthermore, with the advent of heat reclaim loops and high speed defrost cycles, even more refrigerant is used.

Unfortunately, the refrigerants typically used in such refrigeration systems (i.e. refrigerants 404, 408, 507, AZ-20 and the like) are expensive and are often volatile, whereby they may be hazardous to human health and to the environment. The more these refrigerants are used, the higher is the risk of polluting the environment.

SUMMARY OF THE INVENTION

It is a feature of the present invention to provide a refrigeration systems having reduced amounts of the above stated refrigerants.

It is a further feature of the present invention to provide a refrigeration system optimizing heat reclaim with respect to compressor operation.

[According to the above feature of the present invention, and from a broad aspect thereof, the present invention provides a refrigeration system having a main refrigeration circuit having a condensing stage, wherein a first refrigerant in a high pressure gas state is condensed at least partially to a liquid state. The condensing stage ha a pair of stand-alone condensing stage closed loops in heat exchange relation with the main refrigeration circuit. The stand-alone condensing stage closed loops are parallel one to another and each comprise a second refrigerant circulating between at least a heat absorption stage, wherein the second refrigerant absorbs heat from the first refrigerant in the main refrigeration circuit so as to condense the first refrigerant to the liquid state, and a heat release stage, wherein the second refrigerant releases the absorbed heat. The condensing stage has modulating valves for selectively and quantitatively modulating the temperature of said first refrigerant and compressor head pressure.]

*Therefore, in accordance with the present invention, there is provided a refrigeration system having a main refrigeration circuit, wherein a first refrigerant goes through at least a compressing stage, wherein said first refrigerant is compressed to a high pressure gas state to then reach a condensing stage, wherein said high pressure gas refrigerant is condensed at least partially to a liquid state to then reach an expansion stage, wherein said high pressure liquid refrigerant is expanded to a low pressure liquid state to then reach an evaporator stage, wherein said low pressure liquid refrigerant is evaporated at least partially to a low pressure gas state by absorbing heat, to then return to said compressing stage, said condensing stage having at least one stand-alone condensing stage closed loop in heat exchange relation with said main refrigeration circuit, said stand-alone condensing stage closed loop being in parallel with a condenser of the condensing stage and comprising a second refrigerant circulating between at least a heat absorption stage, wherein said second refrigerant absorbs heat from a portion of said first refrigerant in said main refrigeration circuit so as to condense said first refrigerant to said liquid state, and a heat release stage, wherein said second refrigerant releases said absorbed heat, said condensing stage having modulating valve means for selectively and quantitatively modulating the temperature of said first refrigerant and compressor head pressure.*

*Further in accordance with the present invention, there is provided a refrigeration system having a main refrigeration circuit, wherein a first refrigerant goes through at least a compressing stage, wherein said first refrigerant is compressed to a high pressure gas state to then reach a condensing stage, wherein said high pressure gas refrigerant is condensed at least partially to a liquid state to then reach an expansion stage, wherein said high pressure liquid refrigerant is expanded to a low pressure liquid state to then reach an evaporator stage, wherein said low pressure liquid refrigerant is evaporated at least partially to a low pressure gas state by absorbing heat, to then return to said compressing stage, said condensing stage having at least a pair of stand-alone condensing stage closed loops in heat exchange relation with said main refrigeration circuit, said stand-alone condensing stage closed loops being parallel one to another and each comprising a second refrigerant circulating between at least a heat absorption stage, wherein said second refrigerant absorbs heat from said first refrigerant in said main refrigeration circuit so as to condense said first*

*refrigerant to said liquid state, and a heat release stage, wherein said second refrigerant releases said absorbed heat, said condensing stage having modulating valve means for selectively and quantitatively modulating the temperature of said first refrigerant and compressor head pressure as a function of at least one of an outdoor temperature and an indoor ambient temperature.*

BRIEF DESCRIPTION OF THE DRAWINGS

A preferred embodiment of the present invention will now be described in detail having reference to the accompanying drawings in which.

DESCRIPTION OF PREFERRED EMBODIMENTS

Figure 1:
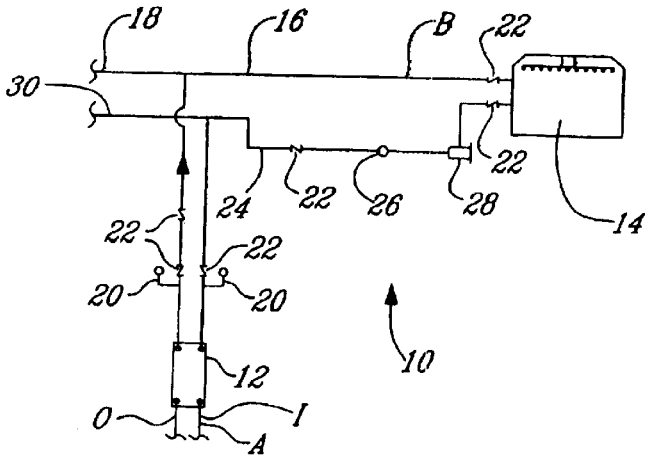
FIG. 1 is a schematic diagram illustrating a stand-alone evaporative condenser loop of the present invention.

Referring to FIG. 1, there is generally shown at 10 a stand-alone evaporative condenser loop of the present invention. The loop 10 comprises a plate heat exchanger 12 for the heat exchange between a refrigerant A in a refrigeration system and a refrigerant B in the evaporative condenser loop 10. Refrigerant A of the refrigeration system entering the heat exchanger 12 is from the output of compressors in a high pressure hot gas state, and goes through the heat exchanger 12 to release latent heat by condensing, to then exit therefrom at least partially in a high pressure liquid state. Thus, a gas refrigerant line from the refrigeration system is shown entering the heat exchanger 12 through inlet line 1, whereas a liquid refrigerant line exits the heat exchanger 12 at outlet line O. The refrigeration system will be described in further detail hereinafter.

The condensing loop 10 has an evaporative condenser 14. The evaporative condenser 14 typically comprises a coiling system therein, across which a fluid flows in order for refrigerant within the coiling system to release heat it has previously absorbed in the heat exchanger 12. For instance, the fluid may be air or a spray of water flowing over the coiling system. A condenser feedline 16 connects the heat exchanger 12 to the evaporative condenser 14. It is pointed out that the condensing loop 10 may be provided with a plurality of evaporative condensers 14, wherefore a branch line 18 is shown diverging from the condenser feedline 16 to add similar evaporative condensers 14 in parallel to the first one. The condenser feedline 16 is provided with valves and control devices to ensure the flow direction and the proper refrigerant conditions. For instance, a manometer 20 is shown mounted in the condenser feedline 16, as well as a plurality of check valves 22.

A condenser return line is generally shown at 24 and connects the evaporative condenser 14 to the heat exchanger 12, so as ensure the flow of cooled refrigerant from the evaporative condenser 14 to the heat exchanger 12. A pump 26 is provided in the condenser return line 24 to ensure the flow of the refrigerant B in the condensing loop 10. A filter 28 in the condenser return line 24 filters out the refrigerant. Further check valves 22 and manometer 20 are provided in the condenser return line 24. Furthermore, parallel loops (not shown) along with manually operated valves (e.g. three-way valves, ball valves, butterfly valves) may also be provided in order to isolate the various components of the condensing loop 10 for maintenance or for servicing purposes. A branch line 30 is shown connecting to the condenser return line 24 in the event where more than one evaporative condenser 14 are part of the condensing loop 10.

Figure 2:
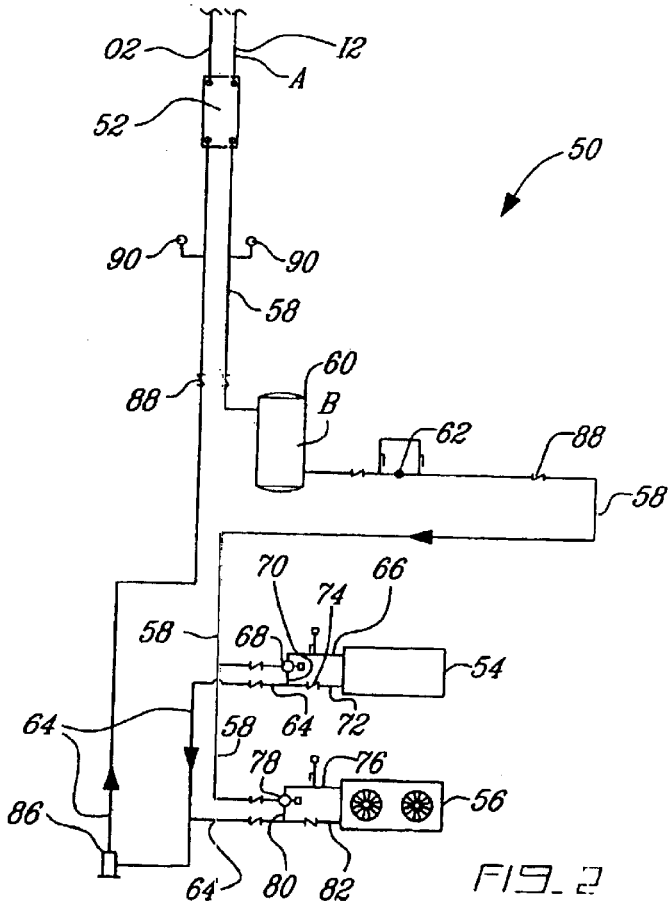
FIG. 2 is a schematic diagram depicting a stand-alone heat reclaim loop of the present invention.

Referring now to FIG. 2, a stand-alone heat reclaim loop in accordance with the present invention is generally shown at 50. The heat reclaim loop 50 comprises a plate heat exchanger 52, provided for absorbing heat from a refrigerant A in a refrigeration system. The refrigerant A in the refrigeration system is in a high pressure hot gas state when entering the heat exchanger 52 and is condensed to a liquid state to then exit the heat exchanger 52. The inlet line of hot pressure gas refrigerant A is shown at 12, whereas the outlet of condensed liquid refrigerant A is shown at outlet line O2.

The heat reclaim loop 50 has a heat reclaim coil 54 and a air heating unit 56. The heat reclaim coil 54 is typically installed in a ventilation duct through which air circulates, so as to warm up the air. The air heating unit 56 is typically provided for heating areas where ventilation is not required (e.g. shipping dock, entrance). It is pointed out that the heat reclaim loop 50 may be limited to either one of the heat reclaim coil 54 and the heating unit 56, or may even have a plurality of both. A heat reclaim feedline 58 connects the heat exchanger 52 to the heat reclaim coil 54 and to the air heating unit 56 to ensure the flow of a refrigerant B therebetween. An accumulation tank 60 is connected in the heat reclaim feedline 58 for accumulating refrigerant B having absorbed heat in the heat exchanger 52. A pump 62 is also mounted in the heat reclaim feedline 58, downstream from the accumulation tank 60 to ensure the flow of refrigerant B from the accumulation tank 60 to the heat reclaim coil 54 and the air heating unit 56. A heat reclaim return line 64 connects the heat reclaim coil 54 and the air heating unit 56 to the heat exchanger 52, thereby ensuring the flow of refrigerant B from the formers to the latter.

The heat reclaim coil 54 has an inlet line 66 separated from the heat reclaim feedline 58 by a three-way valve 68. A by-pass line 70 is connected to the free port of the three-way valve 68 and converges with an outlet line 72 of the heat reclaim coil 54 to reach the heat reclaim return line 64. Thus, the three-way valve 68 controls the flow of refrigerant B from the heat reclaim feedline 58 to the heat reclaim coil 54. The three-way valve 68 may be fully closed to the inlet line 66 of the heat reclaim coil 54, whereby refrigerant B flows through the by-pass line 70 to reach the heat reclaim return line 64. It is pointed out that the outlet line 72 comprises a check valve 74 such that refrigerant by-passing the heat reclaim coil 54 is prevented from entering same through the outlet line 72 thereof.

The air heating unit 56 is connected to the heat reclaim loop 50 in parallel to the heat reclaim coil 54. The heating unit 56 has an inlet line 76 connected to the heat reclaim feedline 58 through a three-way valve 78. The free port of the three-way valve 78 is connected to a by-pass line 80 which converges with an outlet line 82 of the heating unit 56 to connect to the heat reclaim return line 64. Similarly to the heat reclaim coil 54, the flow of refrigerant B to the heating unit 56 is controlled by the three-way valve 78. Once more, the heating unit 56 may be by-passed by the refrigerant B, whereby refrigerant B circulates through the by-pass line 80 and is prevented from entering the heating unit 56 by the check valve 84 mounted therein.

The pump 62 and the accumulation tank 60 allow storage of refrigerant B, having absorbed heat in the heat exchanger 52. If the heat reclaim coil 54 and the air heating unit 56 are in standby (by being by-passed) as the demand for heating air is low, the tank 60 accumulates the heated refrigerant B such that the heat reclaim loop 50 is able to sustain sudden and rapid increases in demand of heating air. The pump 62 may stop operating beyond certain levels of refrigerant B. It is pointed out that the accumulation tank 60 may be insulated to keep the refrigerant therein in given states. The pump 62 may be automated in order to operate automatically according to factors such as outdoor and indoor temperatures, as well as refrigerant B temperature. Increased refrigerant B demand may thus be anticipated and fulfilled by the pump 62 and the accumulation tank 60.

The heat reclaim loop 50 comprises various devices for the control of the refrigerant parameters, such as the direction of flow, the pressure and the filtering. For instance, filter 86, check valves 88 and manometers 90 are provided in the heat reclaim loop 50 for the above described reasons.

Now that both the stand-alone evaporative condenser loop 10 and heat reclaim loop 50 have been described in detail, a typical refrigeration system in which the formers may be used will now be described. Because the stand-alone condensing loops use non-polluting refrigerants such as glycol, there is a reduction in the quantity of refrigerant required in the conventional portion of the refrigeration system.

Figure 3:
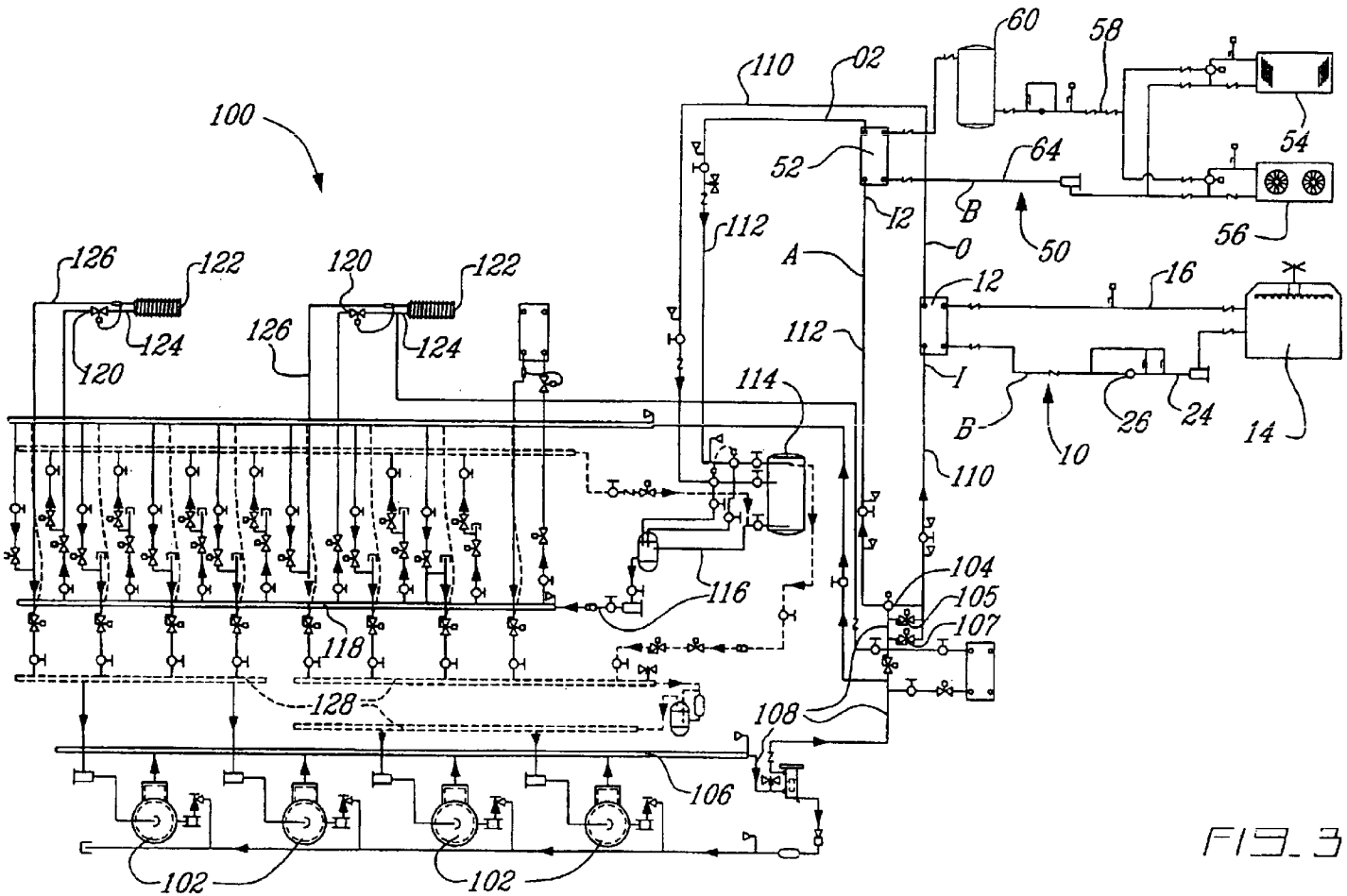
FIG. 3 is a schematic diagram illustrating a refrigeration system having the stand-alone evaporative condenser loop and heat reclaim loop.

Referring now to FIG. 3, a refrigeration system 100 is typically adapted for receiving the stand-alone evaporative condenser loop 10 described in FIG. 1 and the heat reclaim loop 50 described in FIG. 2. The evaporative loop 10 and the heat reclaim loop 50 are shown connected to the refrigeration system 100 parallel one to another. Similarly to the description of the loops 10 and 50, for clarity purposes, a refrigerant, identified as refrigerant A, which will be discussed hereinafter, flows in the refrigeration system 100, whereas a refrigerant, referred to as refrigerant B, flows in the loops 10 and 50. Furthermore, as the invention resides in the portion of the refrigeration system involving the stand-alone evaporative condenser loop 10 and the stand-alone heat reclaim loop 50, which have been described extensively above, the refrigeration system 100 will only be described schematically. For instance, the refrigeration system 100 shown in FIG. 3 comprises high speed defrost loops which will not be described herein.

As shown in FIG. 3, the refrigeration system 100 comprises a plurality of compressors 102. Refrigerant A from compressors 102 is in a high pressure gas state. A header 106 and a high pressure gas line 108 are connected to the outlets of the compressors 102 so as to convey the high pressure gas refrigerant A exiting therefrom to a three-way control valve 104 and modulating valves 105 and 107, which separates the high pressure gas line 108 into an evaporative condenser line 110 and a heat reclaim line 112. Both the evaporative condenser line 110 and the heat reclaim line 112 will converge to a liquid refrigerant reservoir 114, after having high pressure gas refrigerant A gone through heat exchangers 12 and 52 of the evaporator condenser loop 10 and the heat reclaim loop 50, respectively. Therefore, as the evaporative condenser line 110 and the heat reclaim line 112 diverge at the valves 104, 105 and 107 and converge at the refrigeration reservoir 114, these lines are parallel one to another. It is pointed out that the evaporative condenser line 112 was referred to as input line I and output line O in FIG. 1, wherefore reference letters I and O have been added to FIG. 3. Similarly, the heat reclaim line 112 was referred to in FIG. 2 as inlet line 12 and outlet line O2, wherefore reference letters for the latters have been added to FIG. 3.

The three-way control valve 104 and the modulating valves 105 and 107 are adapted to control the amounts of refrigerant A flowing to the evaporative condenser line 110 and the heat reclaim line 112. A main objective of the refrigeration system 100 is to recuperate as much heat as possible from the refrigerant A requiring to be condensed at least partially to a liquid state. However, in order to keep the operation costs low for such a refrigeration system, the compressor 102 must operate with the head pressures as low as possible, yet by fulfilling the compression needs of the system. By the use of parallel condenser line 110 and heat reclaim line 112, it is possible to optimize the head pressure of the refrigerant A in the main refrigeration system 100. According to a plurality of factors which will be described hereinafter, the three-way control valve 104 and the modulating valves 105 and 207 can completely shut the feeding of high pressure gas refrigerant A to either one of the heat exchanger 12 and heat exchanger 52, as well as modulate and control the output pressure of the compressor 102. As mentioned in the description of the evaporative condenser loop 10 and the heat reclaim loop 50, the high pressure gas refrigerant A exiting the heat exchangers 12 and 52, respectively, through outlet lines O and O2, is in a high pressure liquid state.

Typically, the head pressure in the condenser line 110 floats in order to maintain the pressure of refrigerant A in this portion of the refrigeration system at a relatively low pressure. As the evaporative condenser loop 10 has great cooling capacities due to the use of water to cool refrigerant B, which then cools refrigerant A through heat exchanger 12, the condenser line 110 allows lowering of the output refrigerant A pressure of the compressors 102, thereby resulting in energy savings. Modulating valves 105 and 107 modulate the output pressure of the compressors 102. One, for instance, may operate at lower pressures, whereas the other works at higher pressures. The pressure of refrigerant A varies according to a few factors. The compressors must operate as little as possible, as they increasingly consume electricity as a function of their pressure output. On the other hand, the refrigerant released from the compressors 102 must be at a temperature above that of the cooling fluid, usually a predetermined constant pressure differential (e.g., +15° C.). In the present invention, the cooling fluid is refrigerant B, which is actually cooled by the ventilation air in the heat reclaim coil 54 or the heating unit 56 in the case of the heat reclaim line 112, and by water in the evaporative condenser 14 in the case of the evaporative condenser line 10. Therefore, the temperature and pressure of the refrigerant A are modulated in accordance with the heat reclaim demand, the indoor air temperature and the outdoor air temperature.

Thereafter, high pressure liquid refrigerant A accumulated in the liquid refrigerant reservoir 114 flows through a liquid refrigerant line 116 and liquid refrigerant header 118 to reach the expansion valves 120 of the refrigeration system 100. High pressure liquid refrigerant A flowing across the expansion valves 120 expands to be lowered in pressure. Therefore, refrigerant A, in a low pressure liquid state, flows to evaporators 122 through evaporator inlet lines 124, which extend between the expansion valves 120 and the evaporators 122. The low pressure liquid A is at a temperature well below the desired temperature of the refrigerator units (not shown). The refrigerant A absorbs heat in the evaporators 122, whereby it exits the evaporators 122 in a gas state. The low pressure liquid refrigerant A exists the evaporators 122 in evaporator outlet lines 126 to reach a suction header 128 to then return to the compressors 102.

Typical refrigerants used as refrigerant A are refrigerants 404, 408, 507, AZ-20. The typical refrigerants used as refrigerant A may be volatile, whereby they are a threat to the environment as they evaporate at ambient conditions. Furthermore, they are toxic and are likely hazardous to health. The evaporative condenser loop 10 and the heat reclaim loop 50 allow for the reduction of size of the refrigeration system 100. Typically, the evaporative condenser line 110 and the heat reclaim line 112 extend from the compressors 102 to the roof top of the building to reach condensers of the condenser stage, wherein heat is released to the environment. Accordingly, these lengthy networks of piping must be filled with refrigerant A for the proper functioning thereof.

The stand-alone evaporative condenser loop 10 and heat reclaim loop 50 extend from adjacent the compressors 102 to the various condensing units thereof, namely the evaporative condenser 14, the heat reclaim coil 54 and the air heating unit 56. Therefore, the evaporative condenser line 110 and the heat reclaim line 112 are substantially shortened, whereby the amount of refrigerant A in the refrigeration system 100 is greatly reduced. As the refrigerant B must not sustain great variations in temperature as compared to the refrigerant A which must rise above the outdoor temperature to condense and drop below the refrigerator temperature to evaporate, the sole purpose of the refrigerant B is to absorb heat to condense the refrigerant A. Therefore, refrigerant B may be any of the following: ethylic acetate, acetic acid, sulfuric acid, ammoniac, calcium chloride, hydrogen chloride, methylene chloride, sodium chloride, vinyl chloride, carbon dioxide, ethanol, ethylene glycol, acetate formiate, potassium formiate, iso-butane, Pekasol 50, propane, propylene glycol, toluene, trichloroethylene. In any event, refrigerant B is chosen amongst safer fluids than refrigerant A. As the piping of the refrigeration system 100 is greatly reduced, the compressors 102 are not required to outlet compressed refrigerant at pressures as high as for longer refrigeration lines. The compressors can operate at head pressures of about 120 psi instead of 220 psi, thereby reducing their operating time and increasing their life-span. Therefore, substantial savings are achieved in electricity consumption of the compressors 102, and the life of the compressors 102 is increased.

The three-way control valve 104 and the modulating valves 105 and 107 redirect the flow of refrigerant A towards heat exchanger 12 or heat exchanger 52 according to the seasonal heat requirements of the building in which the refrigeration system 100 is. The stand-alone heat reclaim loop 50 advantageously recuperates the heat produced by the compressors 102. The evaporative condenser 14 of the stand-alone evaporative condenser loop 10 may either release the heat outdoors, or recover the heat by, for instance, spraying a liquid such as water on the coils of the evaporative condenser 14 to absorb the excess heat. Thus, in the fall, winter and spring seasons, a greater amount of refrigerant is circulated in the heat exchanger 52, whereby the heat absorbed from refrigerant A will serve for heating the building. It is pointed out that the refrigeration system 100 may be provided with only one of the evaporative condenser loop 10 or the heat reclaim loop 50.

It is within the ambit of the present invention to cover any obvious modifications of the embodiments described herein, provided such modifications fall within the scope of the appended claims.

What is claimed is:

1. A refrigeration system having a main refrigeration circuit, wherein a first refrigerant goes through at least a compressing stage, wherein said first refrigerant is compressed to a high pressure gas state to then reach a condensing stage, wherein said high pressure gas refrigerant is condensed at least partially to a liquid state to then reach an expansion stage, wherein said high pressure liquid refrigerant is expanded to a low pressure liquid state to then reach an evaporator stage, wherein said low pressure liquid refrigerant is evaporated at least partially to a low pressure gas state by absorbing heat, to then return to said compressing stage, said condensing stage having at least [a pair of] *one* stand-alone condensing stage closed loop[s] in heat exchange relation with said main refrigeration circuit, said stand-alone condensing stage closed loop[s] being *in* parallel [one to another] *with a condenser of a condensing stage* and [each] comprising a second refrigerant circulating between at least a heat absorption stage, wherein said second refrigerant absorbs heat from *a portion of* said first refrigerant in said main refrigeration circuit so as to condense said first refrigerant to said liquid state, and a heat release stage, wherein said second refrigerant releases said absorbed heat, said condensing stage having modulating valve means for selectively and quantitatively modulating the temperature of said first refrigerant and compressor head pressure.

2. The refrigeration system according to claim 1, wherein said second refrigerant is one of ethylic acetate, acetic acid, sulfuric acid, ammoniac, calcium chloride, hydrogen chloride, methylene chloride, sodium chloride, vinyl chloride, carbon dioxide, ethanol, ethylene glycol, acetate formiate, potassium formiate, iso-butane, Pekasol 50, propane, propylene glycol, toluene, and trichloroethylene.

3. The refrigeration system according to claim 1, wherein said heat exchange relation between said main refrigeration circuit and said condensing stage closed loops is achieved by plate heat exchangers.

4. The refrigeration system according to claim 1, wherein said heat release stage of [a first of] said closed loop[s] comprises at least one of a heat reclaim coil and a heating unit[, and a second one of said closed loops comprises an evaporative condenser].

5. The refrigeration system according to claim 4, wherein said heat release stage of [said first of] said closed loop[s] comprises valves to selectively chose flow of said second refrigerant through at least one of said heat reclaim coil and said heating unit.

6. The refrigeration system according to claim 1, wherein absorbed heat from said second refrigerant in said heat release stage is released by at least one of being evacuated outdoors, heating water and heating air.

7. The refrigeration system according to claim 6, further comprising valves for selecting the releasing of said absorbed heat from said second refrigerant in said heat release stage.

8. The refrigeration system according to claim 1, further comprising an absorbed heat reservoir downstream from said heat absorption stage in [said first of] said closed loop[s], wherein said second refrigerant is accumulated prior to being fed to said heat release stage.

9. The refrigeration system according to claim 1, wherein said modulating valve means comprises at least a valve for selectively and quantitatively directing flow of said first refrigerant for heat exchanging with said closed loop[s].

10. The refrigeration system according to claim 9, wherein said modulating valve means comprises two modulating valves and a three-way directional valve connecting said compressing stage to said condensing stage.

11. A refrigeration system having a main refrigeration circuit, wherein a first refrigerant goes through at least a compressing stage, wherein said first refrigerant is compressed to a high pressure gas state to then reach a condensing stage, wherein said high pressure gas refrigerant is condensed at least partially to a liquid state to then reach an expansion stage, wherein said high pressure liquid refrigerant is expanded to a low pressure liquid state to then reach an evaporator stage, wherein said low pressure liquid refrigerant is evaporated at least partially to a low pressure gas state by absorbing heat, to then return to said compressing stage, said condensing stage having at least a pair of stand-alone condensing stage closed loops in heat exchange relation with said main refrigeration circuit, said stand-alone condensing stage closed loops being parallel one to another and each comprising a second refrigerant circulating between at least a heat absorption stage, wherein said second refrigerant absorbs heat from said first refrigerant in said main refrigeration circuit so as to condense said first refrigerant to said liquid state, and a heat release stage, wherein said second refrigerant releases said absorbed heat, said condensing stage having modulating valve means for selectively and quantitatively modulating the temperature of said first refrigerant and compressor head pressure as a function of at least one of an outdoor temperature and an indoor ambient temperature.

12. The refrigeration system according to claim 11, wherein said second refrigerant is one of ethylic acetate, acetic acid, sulfuric acid, ammoniac, calcium chloride, hydrogen chloride, methylene chloride, sodium chloride, vinyl chloride, carbon dioxide, ethanol, ethylene glycol, acetate formiate, potassium formiate, iso-butane, Pekasol 50, propane, propylene glycol, toluene, and trichloroethylene.

13. The refrigeration system according to claim 11, wherein said heat exchange relation between said main refrigeration circuit and said condensing stage closed loops is achieved by plate heat exchangers.

14. The refrigeration system according to claim 11, wherein said heat release stage of a first of said closed loops comprises at least one of a heat reclaim coil and a heating unit, and a second one of said closed loops comprises an evaporative condenser.

15. The refrigeration system according to claim 14, wherein said heat release stage of said first of said closed loops comprises valves to selectively chose flow of said second refrigerant through at least one of said heat reclaim coil and said heating unit.

16. The refrigeration system according to claim 11, wherein absorbed heat from said second refrigerant in said heat release stage is released by at least one of being evacuated outdoors, heating water and heating air.

17. The refrigeration system according to claim 16, further comprising valves for selecting the releasing of said absorbed heat from said second refrigerant in said heat release stage.

18. The refrigeration system according to claim 11, further comprising an absorbed heat reservoir downstream from said heat absorption stage in said first of said closed loops, wherein said second refrigerant is accumulated prior to being fed to said heat release stage.

19. The refrigeration system according to claim 11, wherein said modulating valve means comprises at least a valve for selectively and quantitatively directing flow of said first refrigerant for heat exchanging with said closed loops.

20. The refrigeration system according to claim 19, wherein said modulating valve means comprises two modulating valves and a three-way directional valve connecting said compressing stage to said condensing stage.

*21. The refrigeration system according to claim 1, wherein the condenser of the condensing stage is in a second stand-alone condensing stage closed loop in heat exchange relation with said main refrigeration circuit, said second closed loop also comprising said second refrigerant circulating between at least a heat absorption stage, wherein said second refrigerant absorbs heat from a portion of said first refrigerant in said main refrigeration circuit so as to condense said first refrigerant to said liquid state, and a heat release stage, wherein said second refrigerant releases said absorbed heat.*

*22. The refrigeration system according to claim 21, wherein the condenser is an evaporation condenser.*

* * * * *